(12) United States Patent
Nelson et al.

(10) Patent No.: US 7,412,702 B1
(45) Date of Patent: *Aug. 12, 2008

(54) SYSTEM SOFTWARE DISPLACEMENT IN A VIRTUAL COMPUTER SYSTEM

(75) Inventors: Michael Nelson, Danville, CA (US); Scott W. Devine, San Jose, CA (US); Beng-Hong Lim, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 11/240,091

(22) Filed: Sep. 30, 2005

Related U.S. Application Data

(63) Continuation of application No. 09/877,378, filed on Jun. 8, 2001, now Pat. No. 6,961,941.

(51) Int. Cl.
*G06F 9/455* (2006.01)
*G06F 9/46* (2006.01)
*G06F 3/00* (2006.01)
*G06F 9/44* (2006.01)
*G06F 13/00* (2006.01)
*G06F 13/12* (2006.01)

(52) U.S. Cl. .......................... 718/1; 718/104; 719/319; 703/20; 703/21

(58) Field of Classification Search ................ 719/310, 719/320, 319; 718/1, 104; 703/13, 20–21; 711/147, 150–151
See application file for complete search history.

(56) References Cited

U.S. PATENT DOCUMENTS

| | | | | |
|---|---|---|---|---|
| 4,835,677 A * | 5/1989 | Sato et al. | | 718/1 |
| 5,255,379 A * | 10/1993 | Melo | | 711/202 |
| 5,369,750 A * | 11/1994 | Inoue et al. | | 718/100 |
| 5,499,379 A * | 3/1996 | Tanaka et al. | | 710/40 |
| 5,913,058 A * | 6/1999 | Bonola | | 713/2 |
| 6,017,938 A * | 1/2000 | Bershad | | 514/356 |
| 6,075,938 A * | 6/2000 | Bugnion et al. | | 703/27 |
| 6,507,904 B1 * | 1/2003 | Ellison et al. | | 712/229 |
| 6,735,601 B1 | 5/2004 | Subrahmanyam | | 707/200 |
| 6,961,941 B1 * | 11/2005 | Nelson et al. | | 719/319 |
| 2001/0039597 A1 * | 11/2001 | Senator | | 709/325 |
| 2001/0054055 A1 * | 12/2001 | Bollella | | 709/102 |

(Continued)

*Primary Examiner*—Meng-Ai An
*Assistant Examiner*—Qing-Yuan Wu
(74) *Attorney, Agent, or Firm*—Jeffrey Pearce

(57) ABSTRACT

A computer architecture includes a first operating system (COS), which may be a commodity operating system, and a kernel, which acts as a second operating system. The COS is used to boot the system as a whole. After booting, the kernel is loaded and displaces the COS from the system level, meaning that the kernel itself directly accesses predetermined physical resources of the computer. All requests for use of system resources then pass via the kernel. System resources are divided into those that, in order to maximize speed, are controlled exclusively by the kernel, those that the kernel allows the COS to handle exclusively, and those for which control is shared by the kernel and COS. In the preferred embodiment of the invention, at least one virtual machine (VM) runs via a virtual machine monitor, which is installed to run on the kernel. Each VM, the COS, and even each processor in a multiprocessor embodiment, are treated as separately schedulable entities that are scheduled by the kernel. Mechanisms for high-speed I/O between VM's and I/O devices are also included.

61 Claims, 5 Drawing Sheets

U.S. PATENT DOCUMENTS

2001/0054114 A1* 12/2001 DuVal et al. ................. 709/247
2002/0046230 A1* 4/2002 Dieterich et al. ............ 709/107
2002/0052977 A1* 5/2002 Stall ........................... 709/313
2002/0052978 A1* 5/2002 Stall ........................... 709/313
2002/0075327 A1* 6/2002 Stall ........................... 345/853

* cited by examiner

SYSTEM SOFTWARE DISPLACEMENT IN A VIRTUAL COMPUTER SYSTEM

CROSS-REFERENCE TO RELATED APPLICATIONS

This application is a continuation of U.S. application Ser. No. 09/877,378 and claims priority to issued U.S. Pat. No. 6,961,941 filed 8 Jun. 2001.

BACKGROUND OF THE INVENTION

1. Field of the Invention

This invention relates to a computer architecture, in particular, to an architecture that coordinates the use of system resources for different modules such as virtual machines.

2. Background Art

The advantages of virtual machine technology have become widely recognized. Among these advantages is the ability to run substantially platform-independent applications and to run even multiple operating systems simultaneously. An example of the former advantage is Java: Java "applets" can run within different browsers, for example, as long as they have loaded the Java virtual machine. An example of the latter advantage are several of the products of VMware, Inc., of Palo Alto, Calif., which allow several different operating systems (or even different copies of the same operating system) to run at the same time on an x86 hardware platform. As is well known in the field of computer science, a virtual machine (VM) is a software abstraction—a "virtualization"—of an actual physical computer system. As such, each VM will typically include a virtual CPU, a virtual mass storage disk, a virtual system memory, a virtual operating system (which may simply be a copy of a conventional operating system), and various virtual devices such as a network connector, in which case the virtual operating system will include corresponding drivers. All of the components of the VM may be implemented in software using known techniques to emulate the corresponding components of an actual computer.

If the VM is properly designed, then it will not be apparent to the user that any applications running within the VM are running indirectly, that is, via the virtual operating system and virtual processor. Applications running within the VM will act just as if they would if run on a "real" computer. Executable files will be accessed by the virtual operating system from the virtual disk or virtual memory, which will be simply portions of the actual physical disk or memory allocated to that VM. Once an application is installed within the VM, the VOS retrieves files from the virtual disk just as if they had been pre-stored as the result of a conventional installation of the application. The design and operation of virtual machines is well known in the field of computer science.

Some interface is usually required between a VM and some underlying host operating system and hardware (in particular, the CPU), which are responsible for actually executing VM-issued instructions and transferring data to and from the actual memory and storage devices. A common term for this interface is a "virtual machine monitor" (VMM). A VMM is usually a thin piece of software that runs directly on top of a host, or directly on the hardware, and virtualizes all, or at least some of, the resources of the machine, or at least of some machine. The interface exported to the VM is then the same as the hardware interface of the machine, so that the virtual OS cannot determine the presence of the VMM. The VMM also usually tracks and either forwards (to some form of operating system) or itself schedules and handles all requests by its VM for machine resources, as well as various faults and interrupts.

In some conventional systems, the VMM runs directly on the underlying hardware, and will thus act as the "host" operating system for its associated VM. In other prior art systems, the host operating system is interposed as a software layer between the VMM and the hardware. The implementation and general features of a VMM are known in the art.

One difficulty inherent in the nature of virtualization is that it complicates the 25 need for management and governing of CPU, memory, and I/O resources: Not only are the VM and the VMM in themselves software components that require disk space and CPU time, but each VM acts as a "computer" in its own right, and thus duplicates the demand for resources made by the "host" system in which it is loaded. Prior art systems generally rely on the host operating system to schedule a VM on a CPU, to manage the system memory, and to provide fair sharing of network and disk resources. The problem is that existing host platforms on which virtualized systems are loaded have CPU schedulers that are often inadequate in that they don't cope well with virtual machines using large amounts of physical memory and do not even attempt to provide fair sharing of network and disk resources. This problem is of course only compounded in multi-processor systems.

One of the biggest challenges facing developers of virtualization technology is that of speed or, more precisely, lack of speed. Consider, for example, the operation of accessing the disk. In most prior art systems, if the VM issues a request for access to the virtual disk, then this request must be intercepted by the VMM and mapped to the address space of the physical disk. The VMM must then forward the request to the actual operating system that handles physical disk requests. The operating system must then schedule and carry out the request, and the data must be passed back via the VMM and on to the requesting VM.

In most cases, disk access times are acceptable, and for most applications not even noticeable to the user. The problem of delay becomes more acute, however, when the VM wants to access a resource via a network. Especially in the context of high-speed, broadband network connections, every delay translates directly into a reduction in performance. In order for a VM to transmit or receive a network packet, for example, prior art systems require switches between the VMM and the COS. This results in the VM experiencing significantly higher latency and lower throughput than the same OS running on a native machine. A similar process is gone through on each disk I/O.

Yet another concern of those who design virtualized systems is that each VM (and its related VMM or portion of a VMM) should preferably be as isolated as possible from the others. This reduces the number of possible points of failure of the system as a whole—failure of one VM should not make impossible the proper operation of the others, or of the non-virtualized components of the system.

What is needed is therefore a system architecture that allows the use of one or more VM and that efficiently manages the system resources. The system should be highly fault-tolerant, with as complete isolation of VM's as possible. The speed of the VMs should be increased compared with the prior art, and should preferably be as close to the native performance of the underlying system as possible, even for network and disk I/O operations. This invention provides such architecture.

SUMMARY OF THE INVENTION

The invention provides a method and system for managing resources in a computer. The primary procedures that the system according to the invention performs are: 1) Initializing the computer using a first operating system (COS), which may be a commodity operating system. The COS itself is then running at a most-privileged, system level, the system level being defined as an operational state with permission to directly access predetermined physical resources of the computer; 2) loading a kernel via the COS, the kernel forming a second operating system; 3) starting execution of the kernel, the kernel thereupon substantially displacing the COS from the system level and itself running at the system level; and 4) submitting requests for system resources via the kernel.

The kernel is preferably loaded by loading a load call module within the COS, for example as a driver. When the computer is initialized, a loading module is then called from the load call module, whereupon the loading module loads the kernel. The computer includes at least one processor, which has a hardware instruction pointer. The step of loading the kernel then involves setting, via the loading module, the hardware instruction pointer and forwarding of interrupts and faults generated by the processor and by predetermined ones of the physical resources to point into a memory address space allocated to and controlled by the kernel.

After initialization of the computer, a list of devices initially controlled by the COS is preferably transferred from the COS to the kernel. The devices are then classified into the following groups (which may be empty): host-managed devices, which are controlled by the COS; reserved devices, which are controlled by the kernel; and shared devices, which may be controlled by either the COS or the kernel. Examples of shared devices include mass storage controllers, such as a SCSI device, and a network adapter. When it is best for the COS to handle an interrupt from a host-managed device, then such interrupts are forwarded to the COS via the kernel and are handled within the COS.

Handling of interrupts that are forwarded to the COS and that are generated by host-managed devices is preferably delayed until a subsequent instance of running of the COS. Upon sensing, in the kernel, an interrupt raised by any host-managed device, the interrupt is preferably masked until the subsequent instance of running of the COS, thereby avoiding multiple recurrences of the interrupt.

In the preferred embodiment of the invention, at least one virtual machine (VM) is installed to run on the kernel via a virtual machine monitor (VMM). The kernel thereby separately schedules the execution of the COS and of each VM; the COS and the VM's thereby form separately schedulable and separately executing entities. Within the kernel, each schedulable is preferably represented entity as a corresponding "world," where each world comprises a world memory region with a respective world address space in which is stored a respective world control thread.

The preferred embodiment of the invention is able to switch worlds, that is, switch which corresponding entity is allowed to execute. Switching worlds involves: under control of the kernel, storing current state data for a currently executing schedulable entity in a kernel-controlled memory region; disabling exceptions; loading state data for a subsequently executing schedulable entity; starting execution of the subsequently executing schedulable entity; and then enabling exceptions. In most implementations, the state data for each schedulable entity includes exception flags, memory segments, an instruction pointer, and descriptor tables, which are loaded into an exception flags register, memory segment registers, an instruction pointer register, and descriptor tables, respectively.

The invention may also be used in a multi-processor environment, that is where the computer includes a plurality of hardware processors. In this embodiment, the kernel separately schedules the execution of each processor. The processors thereby also form separately schedulable entities, so that each processor is represented within the kernel as a corresponding system world, where each system having a respective system world address space and a respective system world control thread. In the preferred embodiment of the invention of the multi-processor implementation, each processor is preferably allocated a separate memory mapping cache.

In the preferred embodiment of the invention, which includes virtualization, each VM includes a virtual processor, a virtual operating system (VOS), and an I/O driver for an I/O device loaded within the VOS. In this embodiment, a shared memory space is allocated that is addressable by both the kernel and the VM's I/O driver. An output set of data may then be transferred from the VM to the I/O device according to the following sub-steps: 1) via the VM's I/O driver, setting a pointer to the output set of data in the shared memory region and generating a request for transmission; 2) in the kernel, upon sensing the request for transmission: a) retrieving the output set of data from a position in the shared memory region indicated by the pointer and transferring the retrieved output set of data to a physical transmit buffer portion of the shared memory region; and b) transferring the output data set from the physical transmit buffer portion to the I/O device.

An input set of data may also be transferred from the I/O device to the VM according to the following sub-steps: 1) in the kernel, copying the input set of data into a physical receive buffer portion of the shared memory region; 2) setting the pointer to the physical receive buffer portion; 3) issuing to the VMM an instruction to raise an interrupt; and 4) in the VM, upon sensing the interrupt raised by the VMM, retrieving the input set of data from the physical receive buffer portion of the shared memory region indicated by the pointer.

Using the shared memory space, the input and output data sets may thus be transferred between the VM and the I/O device via only the kernel, in most cases upon sensing only a single request for transmission. The invention is particularly advantageous when it comes to high-speed transfer of data between a VM and a network, where the data sets are network packets and the I/O device is a network connection device.

In the preferred embodiment of the invention, which includes a VM and a VMM, the kernel address space, within which the kernel is stored and which is addressable by the kernel, is mapped into a VMM address space, within which the VMM is stored and which is addressable by the VMM. In computers that have a segmented memory architecture, the memory is addressable via segment registers. The segment length for the VMM is then set large enough, for example, 20 megabytes, that the kernel address space may be mapped within the VMM address space with no need to change a corresponding segment register.

Each VM will typically include a virtual processor, a virtual operating system (VOS), and a virtual disk (VDISK). The invention thereby provides for partitioning the VDISK into VDISK blocks and maintaining an array of VDISK block pointers, which stores sets of VDISK block pointers. A file descriptor table is maintained within the kernel and stores file descriptors, each storing block identification and allocation information, and at least one pointer block pointer. Each pointer block pointer points to one of the sets of VDISK block pointers and each VDISK block pointer identifies the location of a respective one of the VDISK blocks.

It is also possible according to the invention to unload the kernel so as to return the computer even to the state it would have been in had the kernel never been loaded at all. To do this, the following procedure is carried out by the kernel itself and also by the loader (acting as an "unloader"): halting execution of the kernel; reinstating a state of the first operating system that existed before the loading of the kernel; and resuming execution of the first operating system at the most-privileged system level. The kernel will then be functionally removed from the computer.

In particular, during the unloading procedure, the step of reinstating the state of the first operating system involves the following sub-steps: first, restoring interrupt and fault handling from the kernel to the first operating system; second, transferring control of host-managed and shared devices from the kernel to the first operating system; and third, removing the kernel from an address space of the first operating system.

DETAILED DESCRIPTION

Introduction

Figure 1:
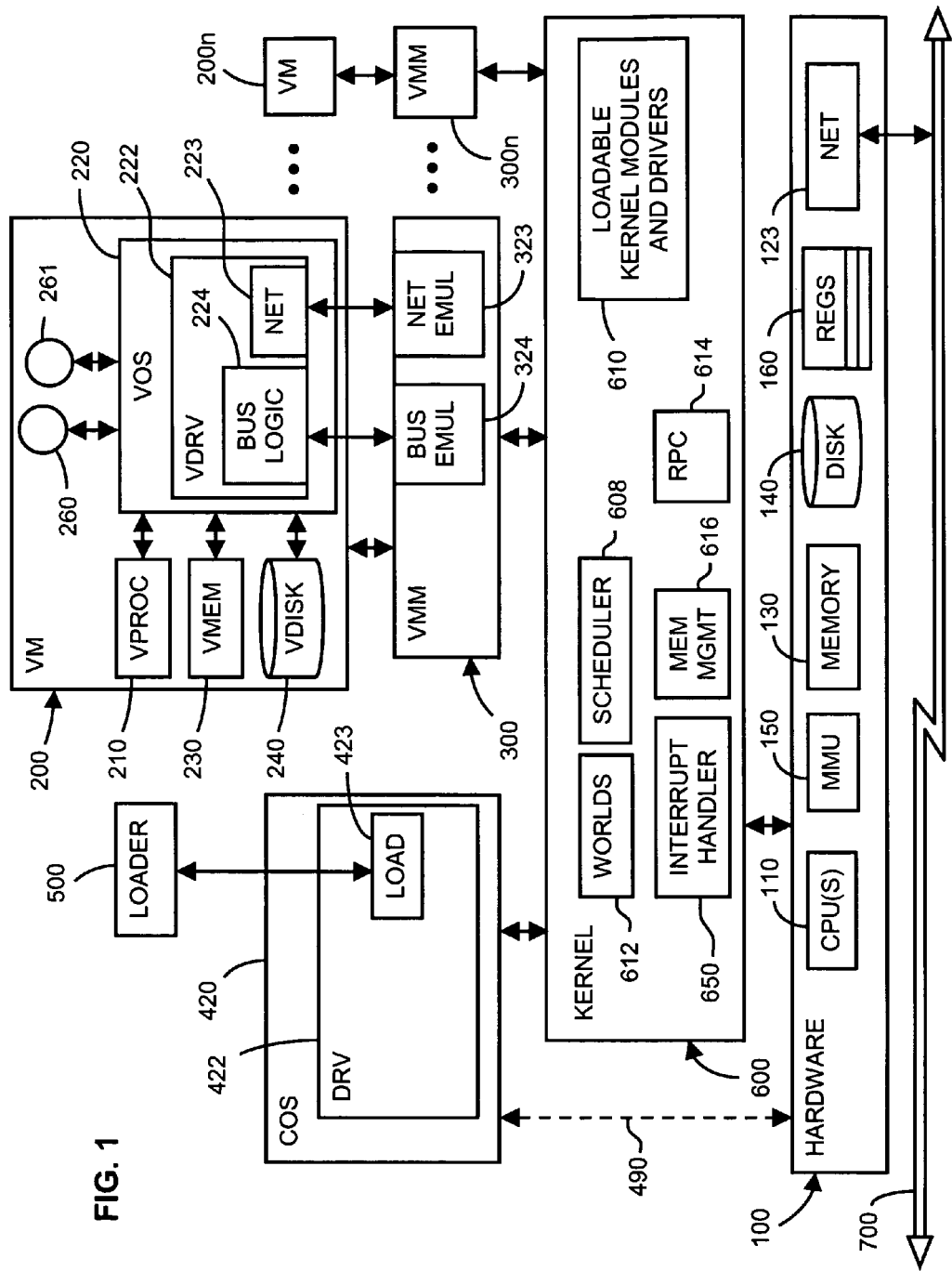
FIG. 1 is a block diagram that illustrates the main hardware and software components of the invention.

The invention is able to improve the performance of virtualized systems with respect to a wide range of operations, especially those involving input and output (I/O) between one or more virtual machines and some resource such as a disk or network connection circuit. Merely by way of example, the invention is explained below primarily in the context of enabling faster data transfer to and from a network. Those skilled in the art will readily know how to adapt the software modules described for network operations to other operations such as access to the system disk.

One advantage of the invention is that it allows very efficient scheduling of system resources for use in different "worlds" (a concept that is explained further below) such as different VM's. Allocation of resources between different worlds is, in fact, so efficient that the resource to be scheduled and allocated may be different CPU's in a multi-processor architecture.

In conventional usage, the concept of "system level" when applied to software refers to those software modules that have direct access to the physical resources of the computer. The operating system (OS) is the most obvious example of system-level software in the prior art: The OS can directly access various hardware resources such as the system disk, system memory, I/O ports, input and display devices, various other peripherals, etc., usually using drivers installed within the OS itself. System-level software may also be defined as the software that operates at the most privileged level of the underlying hardware processor(s), or at least at a privilege level that is greater than that of an application that can access resources only via the OS. Depending on the hardware architecture, the OS typically is able to read from and sometimes even write to registers and tables (such as descriptor tables) from which other software is completely isolated.

The invention is described below in several sections. First, the main hardware and software components are described. Then, the general, yet novel method of operation of the invention is described. Finally, various software modules and mechanisms are described in detail, with particular reference to one illustrative operation, namely, improving the speed of transfer between one or more virtual machines (VM's) and a network.

In many instances, the specifics for implementing various software modules and for performing various operations are given. These relate to a prototype of the invention in which a hardware system having the common Intel x86 architecture, and with a native Linux operating system. This is but one example of the hardware and operating system that can use the invention, but is included here not only because this architecture and this operating system is so common, but also because it has been implemented successfully. Based on what is described here, those skilled in the art of designing computer operating systems will know how to adapt the invention for use with other hardware configurations and native operating systems.

Main Components

FIG. 1 illustrates the main hardware and software components of the invention. A hardware platform 100 includes one or more processors (CPU's) 110, system memory 130, and a disk 140. The system memory will typically be some form of high-speed RAM, whereas the disk (one or more) will typically be a non-volatile, mass storage device that is much slower than the system memory 130. The hardware 100 will also include other conventional mechanisms such as a memory management unit MMU 150 and various registers 160, some of which are mentioned below.

One example of the advantages of the invention that is explained below is the fast transfer of data to and from a network. In FIG. 1, the hardware 100 is therefore shown as including any conventional network connection device 123, such as a modem (used in the broad sense of any device that conditions, modulates and demodulates signals in any form—electrical, optical, etc.) for transfer between the various components of the system and a network 700, which may be any known public or proprietary local or wide-area network such as the Internet, an internal enterprise network, etc.

In the preferred embodiment of the invention, one or more virtual machines (VM's) 200, ..., 200n are installed. Corresponding virtual machine monitors (VMM's) 300, ..., 300n are also included for each respective VM. Each VMM includes all the different modules and mechanisms necessary to enable its respective VM to function normally, such as an interrupt handler, virtual-to-physical memory maps, a binary translator (if needed), etc. These conventional modules and mechanisms are not shown in the figures or described any further here because they are well understood and not specific to this invention. Those VMM modules that are, however, unique to the invention are described below.

As in the prior art, each VM 200, ..., 200n includes a virtual CPU 210 (VPROC), a virtual operating system 210 (VOS), which may simply be a copy of a conventional OS, a virtual system memory 230 (VMEM), and a virtual mass storage disk 240 (VDISK). The VM 200 will typically also include virtual peripheral devices (not shown), in which case the VOS 220 will include corresponding drivers 222. In FIG. 1, two applications 260, 261 are shown installed on the VOS 220. There may of course be any number of such applications running on any given VM, just as in any "real," that is, non-virtual, computer system.

As is explained above, a VMM typically includes software modules that emulate the system resources that the VM assumes. These emulation modules will then typically also handle any necessary conversions between the resources as exported to the VM and the actual physical resources. For example, the VMM may be set up with a module that emulates a standard Ethernet network device, whereas the underlying, actual, physical network connection may be something else. Any VM installed on the VMM will therefore be able to address the network as if there were an Ethernet configuration.

In FIG. 1, the VMM 300 is shown with a network emulation module 323, as well as a module 324 that emulates the logic of a standard bus. These modules form the interfaces with corresponding drivers 223, 224 loaded within the VOS 220.

As in conventional systems, the system according to the invention includes an operating system (OS) that is configured to act as an interface between various applications and the system resources. In FIG. 1, this OS is shown as module 420. Even in this invention, the OS 420 may be a commodity OS. In the description of the invention below, this OS is assumed to be Linux, although other known operating systems may be used either with no modifications at all, or with modifications that will be within the skill of ordinary OS designers. The OS 420 also includes any necessary drivers 422, one of which (in the preferred embodiment of the invention), referred to here as a load call module 423, is described below.

As in other systems, applications may be installed for running on the operating system. Within the VM 200, for example, the two applications 260, 261 are installed on the VOS 220. In the preferred embodiment of the invention, one special "application" is installed on the OS 420, namely, the loader 500. The function of the loader is explained below.

In conventional computer architectures, the operating system is at system level. As shown in FIG. 1, the OS 420 is not; rather, a software module referred to here as the "kernel" 600 is interposed between the OS 420 and the hardware platform. Thus, the kernel 600 may be viewed either as displacing the OS 420 from the system level and taking this place itself, or as residing at a "sub-system level." When interposed between the OS 420 and the hardware 100, the kernel 600 essentially turns the OS 420 into an "application," which has access to system resources only when allowed by the kernel 600, which schedules the OS 420 as if it were any other component that needs to use system resources. For this reason, the OS 420 is referred to here in places as the "console" or the "console OS" or simply the "COS" 420.

The implications and uses of this relationship between the kernel 600 and the COS 420 are discussed below. Note that the arrangement shown in FIG. 1 is the result of the loading of the kernel 600, after which the kernel runs on the native hardware and manages system resources such as those relating to network access and control, CPU time, SCSI ("Small Computer System Interface"—a parallel interface for attaching peripheral devices to computers), etc. At a boot-up time, however, the COS 420 may be at system level and the kernel 600 may not yet even be operational within the system. This is also explained later.

Kernel Installation

As is well know, the processor(s) 110 in any computer system fetch and execute instructions sequentially. A register or memory position is therefore included to serve as an instruction pointer, which indicates the address of the next instruction to be fetched and executed. Moreover, in architectures such as the common Intel x86, the processor will include a number (in x86 systems, there are six) of segment registers (usually, a subset of the registers 160) that enable the processor to properly address memory, which is segmented into units such as pages. To further direct the operation of the processor, the operating system loads these segment registers with values stored in various descriptor tables. Architectures other than the x86 have similar structures, to the extent they are needed at all.

Whenever the processor encounters an error (such as an attempt to address memory outside of some permissible range or a violation of some privilege requirement), or completes some requested task, it typically generates a fault or interrupt signal that the operating system senses and handles in any predetermined manner. For understanding this invention, the important point to keep in mind is that whichever software component contains, sets, loads or otherwise controls the processor(s)' instruction pointer(s), segment registers or analogous structures, and that intercepts and handles faults and other interrupts, has effective control of the entire processing procedure and can exclude other software components, which don't have such capabilities, from directly accessing the hardware 100.

As its name implies, the loader 500 is a software module whose function is to load something else, in this case, the entire kernel 600. When the loader is called, it installs the kernel 600 into memory in such a way that the kernel is located at the system level. The loader 500 does this by setting the hardware instruction pointer, loading the various segment registers (or equivalents), and setting the forwarding of interrupts and faults to point into (that is, to have addresses within the address space controlled by) the kernel 600.

In FIG. 1, the loader 500 is shown as being external to the COS 420, thus, at an application level. This is not necessary. In fact, in the preferred embodiment of the invention, the loader 500 is implemented at system level, inside the COS 420. This has the advantage that it gives the loader full privileges to perform any operations needed. Moreover, it is not necessary for the loader to set up the system tables (for example, the interrupt descriptor table) required by the invention; rather, this may be done by the kernel 600 itself.

General Method of Operation of the Invention

Now that the main components of the invention have been introduced, one can also understand the novel method of operation of the system. This method can be summarized as follows: As a preparatory step, the load call module 423 will be installed as any other driver 422 within the COS 420 and the loader 500 will be accessible for installation, for example, by being stored as any other application on disk 140. As a first step, at power up (or after returning from some other inactive, non-booted state) the system is initialized using the COS 420 to run its boot-up routine as it would on any conventional system. Thus, at the time of boot-up, the COS 420 is at system level and is communicating directly with the underlying hardware platform.

The load call module 423, preferably as a final step of the boot-up procedure (to ensure that the system has otherwise booted normally) then issues a standard call from within the COS 420 to the loader 500, which then loads the kernel 600 at system level as described above, thereby substantially displacing the COS 420 itself to essentially the same level as the VMM's 300, . . . , 300n. After completed installation of the kernel 600, the loader 500 then ends with a call to a starting execution point of the kernel itself.

Put differently, at boot-up, the COS 420 performs its normal functions as an operating system. After loading and launching of the kernel 600, however, the kernel itself becomes the primary operating system of the overall architecture, whereas the COS 420 becomes a secondary, auxiliary operating system that the kernel 600 invokes only to handle certain tasks.

One other function of the load call module 423 is to act as the software interface between applications running on the COS 420 to communicate with the kernel 600. The load call module 423 may be designed using the same well-known techniques that are used to design conventional drivers loaded within operating systems. Note that it is not strictly necessary according to the invention for the load call module to be implemented as a driver within the COS. Any software module within (or even outside of) the COS that operates at a privilege level high enough to perform the functions of the loader described herein may also be used to implement the load call module 423. In theory it would therefore be possible to implement both the load call module 423 and the loader 500 as a single software module. Implementing the load call module 423 as a driver within the COS has at least two advantages, however. First, the design of drivers is well understood in the art of computer programming. Second, such an implementation does not require modification even of commodity operating systems used as the COS.

As is mentioned above, loading of the kernel thus has the effect of substantially converting the COS 420 functionally into an application that is running on the kernel, in that the COS will at that point have access to system resources only if the kernel 600 allows it to. A resource scheduling module 608 within the kernel then allocates system resources, including CPU time and disk access, not only among VMM/VM pairs, but also among these pairs, the COS and any other installed applications.

In many cases, the COS 420 will already have been configured, for example, via installed, commodity drivers, for maximum speed or efficiency when performing certain "non-reserved" or "shared" tasks, such as sensing and/or controlling certain devices like a mouse, trackball, or other input device, floppy disk drives, a display monitor, etc. Above it is mentioned that the COS is substantially displaced from system level and is substantially converted into an "application." In the preferred embodiment of the invention, the displacement of the COS is not complete, rather, as is indicated by the dashed connector 490, the kernel 600 allows the COS to directly communicate with the hardware 100 with respect to shared tasks, although, as is described below, the kernel itself handles and, if appropriate, forwards interrupts relating to even the shared task. In all other cases, handling of tasks is reserved to the kernel. One concept unique to the invention is that the kernel allows the COS 420 to directly handle the processing of non-reserved tasks while by-passing the COS altogether with respect to reserved tasks.

Kernel

Figure 3:
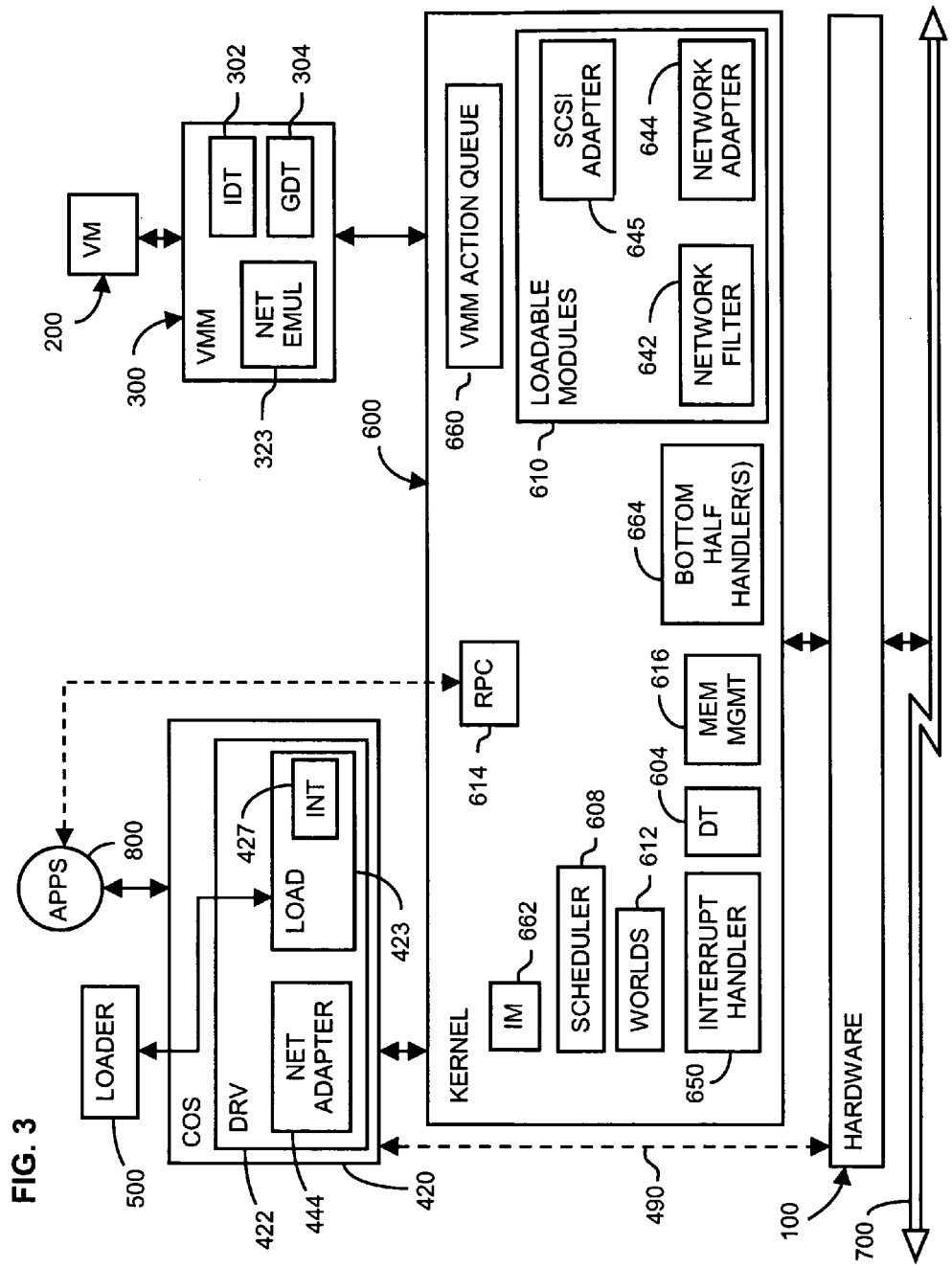
FIG. 3 is a block diagram that illustrates other components of a preferred embodiment of the invention, in particular, of a kernel operating system.

The main components of the kernel 600 are mentioned briefly above. A more specific description of the structure and function of the kernel follows. FIG. 3 also illustrates the kernel structure in greater detail than FIG. 1.

Worlds

The kernel 600 handles not only the various VMM/VM's, but also any other applications running on the kernel, as well as the COS and even the hardware CPU(s) as separate entities that can be separately schedulable entities. In this disclosure, each schedulable entity is represented abstractly as a "world," which contains a thread of control, an address space, machine memory, and handles to the various device objects that it is accessing. Worlds, represented in the figures as a module 612, are stored in a portion of the memory space controlled by the kernel. Each world also has its own task structure, and in systems using a hardware architecture such as the Intel x86, which have segmented memory, an interrupt descriptor table (IDT) and a global descriptor table (GDT). In the illustrated, preferred embodiment of the invention, there are three types of worlds: 1) system worlds, which are used for idle worlds, one per CPU, and a helper world that performs tasks that need to be done asynchronously; 2) a console world, which is a special world that runs in the kernel and is associated with the COS 420; and 3) virtual machine worlds. The kernel itself also comprises a world, but one that controls the scheduling of the others.

In one prototype of the invention, a special world, referred to as a "helper world" was created to perform background or asynchronous tasks. Whenever a component of the kernel needs the helper world to perform a task, it can then call a corresponding helper queuing function with a function and a data field. The helper world will then call this function with the data the next time that the helper is scheduled to run.

Figure 2:
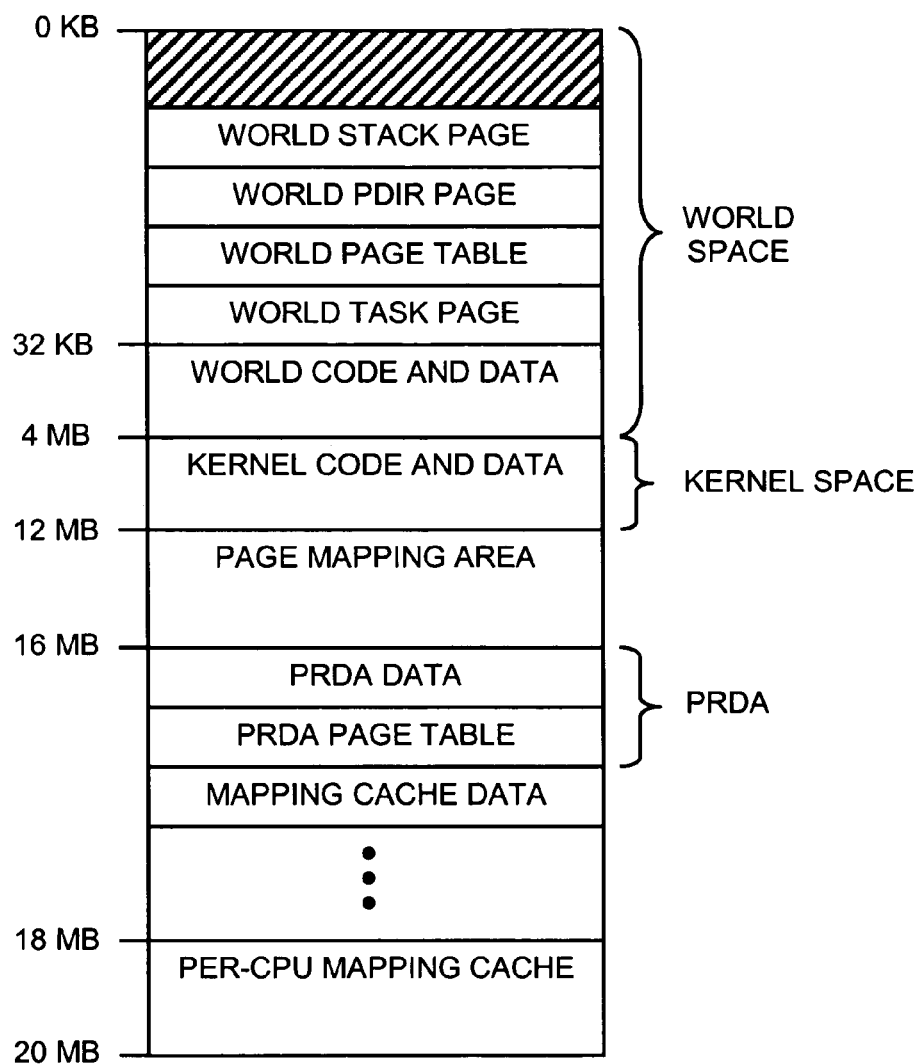
FIG. 2 illustrates the various portions of an address space used by the invention.

FIG. 2 illustrates one possible example of the layout of a world's 20 megabyte (MB) address space that has been used in a prototype of the invention: Code and data are stored in the lower 4 MB of the address space. The world space will also include such structures as a page for the world's stack, its page directory (PDIR), its page table and its tasks.

The code and data structures that make up the kernel 600 itself are stored in the kernel address space. As FIG. 2 illustrates, in the prototype of the invention, the kernel needed no more than 8 MB.

Worlds run at CPL0 (following the nomenclature used in the x86 architecture), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

World Switch

When the world that is running on a particular CPU (which may be the only one) is preempted by or yields to another world, then a world switch has to occur. A world switch involves saving the context of the current world and restoring the context of the new world such that the new world can begin executing where it left off the last time that it is was running.

World switch code located in the kernel (for example, as part of the worlds module 612) relies on each world having the kernel code and data always mapped at the same location in each world's linear address space. The reason for this is that the restoration of a world's state is not atomic, leads in turn to a CPU executing for a short time with the new world's page table but with the old world's GDT. In the preferred embodiment of the invention, this is handled by having the kernel mapped at the same location for each world.

The first part of the world switch procedure that is carried out by the kernel is that the current world's state in saved in a data structure that is stored in the kernel's data area. The state that is saved (assuming the most common case of an underlying Intel x86 architecture) is the following:

1. Exception flags (EFLAGS) register. This register contains important information such as whether interrupts are enabled or not.

2. General purpose registers (EAX, EBX, ECX, EDX, EBP, ESP, ESI, and EDI).

3. Segment registers (CS, DS, ES, FS, GS and SS).

4. Instruction pointer (EIP) register. This is set to the value of a label at the end of the world switch code that is located at the beginning of code that restores the EFLAGS register. The EFLAGS are the last thing that need to be restored before the new world can begin execution. Restoring EFLAGS will have the effect of enabling interrupts if they were enabled when the world switch code was called.

5. Local descriptor table (LDT) register.

6. Task register. The "task busy" flag must be cleared before the kernel saves the task register; otherwise, a machine reset will occur when the task register is restored.

7. Debug registers (DR0, DR1, DR2, DR3, DR6 and DR7).

8. Control registers (CR0, CR2, CR3, and CR4).

9. Interrupt descriptor table (IDT) register.

10. Global descriptor table (GDT) register.

11. Floating point state.

After the state of the current world is saved, the state of the new world can be restored. During the process of restoring the new world's state, no exceptions are allowed to take place because, if they did, the state of the new world would be inconsistent during the restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Figure 5:
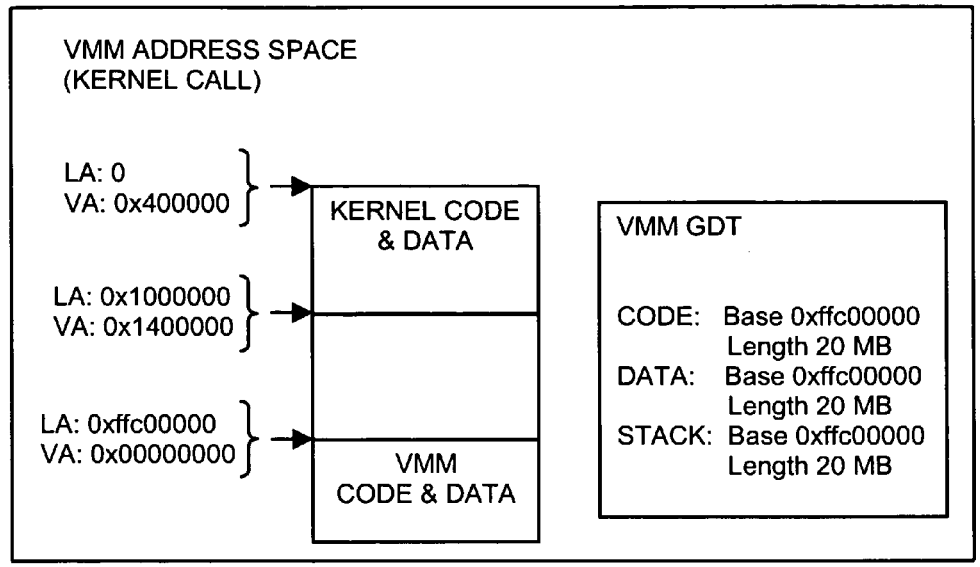
FIGS. 5 and 6 illustrate address spaces used by a virtual machine monitor and by a console or auxiliary operating system in a preferred embodiment of the invention.

When switching from and to the COS world there is one more step that must be performed. When the COS world is running, the kernel code and data are mapped in the high part of the COS's linear address space. When any other world is running, the kernel is loaded into the bottom of the linear address space (see FIG. 5). As is mentioned above, in order to carry out a world switch, the kernel must be mapped at the same location in the address space of the two world's that are being switched between. Before switching from the COS world to any other world, the COS world's page table and GDT are therefore modified such that kernel is mapped in the low part of the address space. Conversely, after switching to the COS world from another world, the COS world's page table and GDT are restored to their original state.

Switching from the COS world to any other world therefore requires a second switching of the page table and GDT registers. This adds extra overhead to every switch from and to the COS world. On the other hand, because there is only one COS world but many other worlds, it is still more efficient for the system to optimize the common case (switching between non-COS worlds) rather than less common case (switching from and to the COS world).

RPC

The kernel 600 in the preferred embodiment of the invention provides a remote procedure call (RPC) mechanism 614 to allow a world to communicate with any applications 800 installed to run on the COS 420. Such applications are referred to here as "console applications." This RPC mechanism may be designed using known programming techniques, and is indicated in FIG. 3 by the dashed connector between the RPC module 614 in the kernel and the application(s) 800 loaded on the COS 420. When the kernel creates an RPC connection, it also gives the connection a name. When the application wants to connect, it then connects by invoking the corresponding connection's name. Once connected, the kernel 600 world can send RPC's to a console application and receive replies.

Memory Management

The kernel 600 includes a memory management module 616 that manages all machine memory that is not allocated exclusively to the COS 420. As in conventional systems, when the COS is started, it is restricted to using only a portion of the machine's memory (typically 64 Mbytes). When the kernel 600 is loaded, the information about the maximum amount of memory available on the machine is then available to the kernel, as well as information about how much of it is being used by the COS. Part of the machine memory is used for the kernel 600 itself and the rest is used for the virtual machine worlds.

Virtual machine worlds use machine memory for two purposes. First, memory is used to back portions of the each world's 4 MB (for example) memory region, that is, to store code, data, stacks, etc. in the VMM page table. For example, the code and data for the VMM is backed by machine memory allocated by the kernel 600. Second, memory is used for the physical memory of the virtual machine. The memory management module may include any algorithms for dynamically allocating memory among the different VM's 200.

Interrupt Handling

The kernel 600 preferably also includes an interrupt handler 650 that intercepts and handles interrupts for all devices on the machine. This includes devices such as the mouse that are used exclusively by the COS. Depending on the type of device, the kernel 600 will either handle the interrupt itself or forward the interrupt to the COS. If the interrupt is shared between a first device used exclusively by the COS and a second device used exclusively by the kernel, then the kernel will handle the interrupt for the second device and then forward the interrupt to the COS for the COS to handle the interrupt for the first device.

In one prototype of a multiprocessor embodiment of the invention (see below), the kernel was also responsible for such tasks as programming the I/O Advanced Programmable Interrupt Controller (IOAPIC). The kernel may then derive, in a known manner, any necessary information about interrupt line routing for related devices from the IOAPIC.

As is discussed below, certain devices are handled exclusively by the kernel. For these devices, all related interrupts are preferably handled by their respective drivers, which will be loaded within the driver software component 610.

Devices

In the preferred embodiment of the invention, the kernel 600 is responsible for providing access to all devices on the physical machine. There are three classes of devices that the kernel 600 must deal with:

1) Host devices, including all ISA (Industry Standard Architecture—the bus architecture used in the IBM PC/XT and PC/AT, and including the specification called "Plug and Play ISA") devices like the keyboard, mouse, floppy, and IDE ("Intelligent Drive Electronics" or "Integrated Drive Electronics," an interface for mass storage devices, in which the controller is integrated into the disk or CD-ROM drive) controller, as well as PCI (Peripheral Component Interconnect—a local bus standard developed by Intel Corporation, but also used on some Macintosh computers) devices that the COS has sole access to.

2) Kernel devices, such as Ethernet and SCSI PCI devices.

3) Shared devices: For example, both SCSI and Ethernet devices can be shared between the kernel 600 and the COS 420—these devices are accessible by both virtual machines 200 and the COS.

For the sake of simplicity, the partitioning of PCI devices is preferably done statically during system configuration. The information about which devices are associated with the kernel 600 and which are associated by the COS is preferably stored in the file (for example, in Linux-based systems, the file lilo.conf) that is file usually included in conventional operating systems to associate devices.

Kernel-Managed I/O Devices

The kernel may also be configured to exclusively manage certain I/O devices such as PCI devices. When the kernel is loaded and launched (that is, when it itself boots), it scans all the appropriate buses to find all its devices. A list of devices that are reserved for the COS 420 is then passed into the kernel 600, which then uses this list to determine whether a device should be available to the kernel 600 or to the COS.

Shared Devices

When devices are shared by the COS and the kernel 600, they are preferably always initially given to the COS, during which time they are inaccessible to the kernel. In some cases, this is necessary: The COS will typically boot off of certain devices such as SCSI, so these devices must be initially available to the COS. In general, it will be easier to transfer control of shared devices from the COS to the kernel rather than vice versa; it will therefore be most efficient to assign at least initial control of shared devices to the COS.

When it becomes desirable for the kernel to be able to access the shared device, control of the device is changed from the COS to the kernel and a corresponding kernel device driver 423 is loaded to initialize the device. The loading module 423 then acts as the interface between the COS and the shared the device; in other words, once the kernel takes control of a shared device, the COS accesses it only though the kernel-associated driver 423.

Kernel File System

Figure 4:
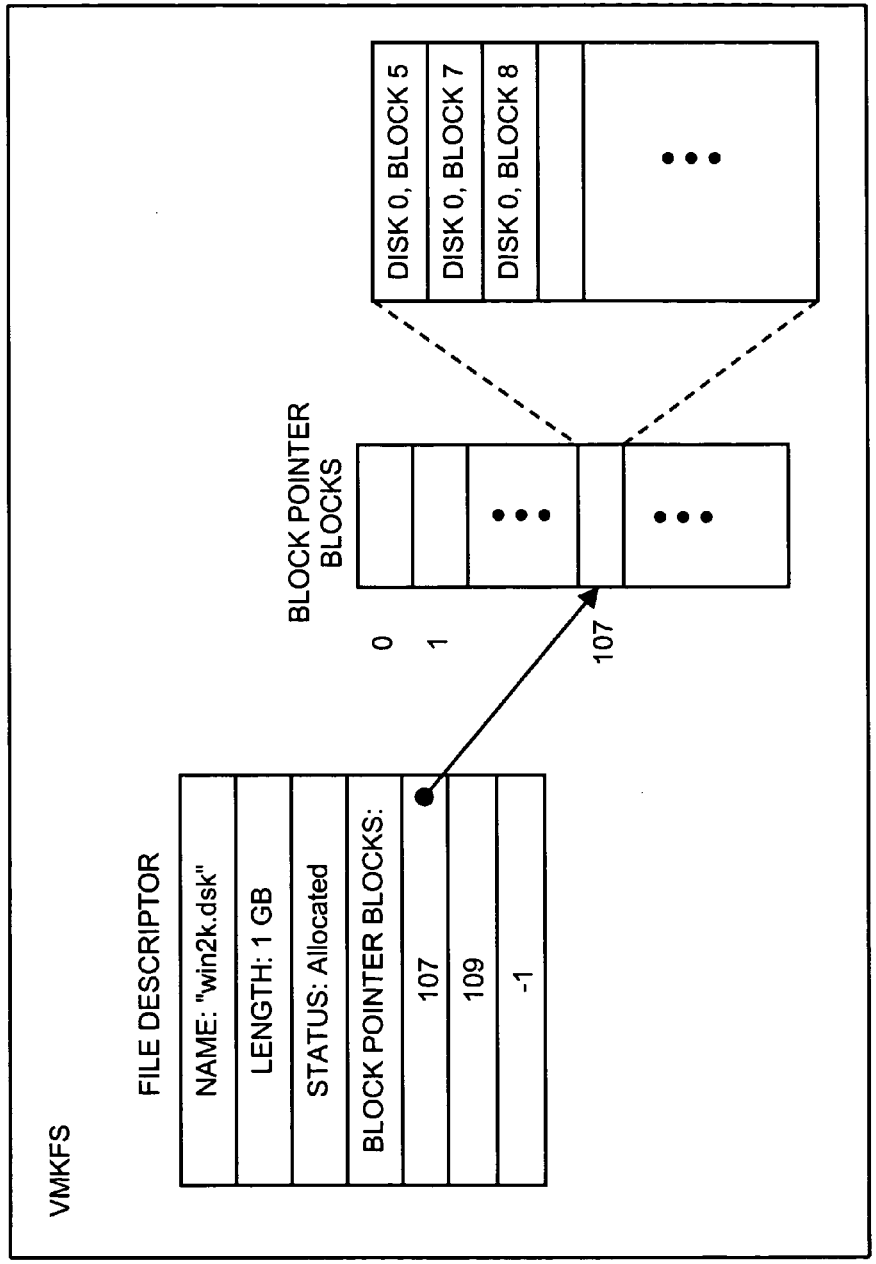
FIG. 4 illustrates a file system used in the preferred embodiment of the invention in computers that have a segmented memory architecture.

The kernel 600 in the preferred embodiment of the invention includes a fast, simple file system, referred to here as the VM kernel file system (VMKFS). FIG. 4 illustrates one example of the VMKFS that was used in a prototype of the invention and that has proved to be particularly efficient for storing virtual disks 240, which typically comprise a small number of large (at least 1 GB) files. By using very large file system blocks (with, for example, a default size of 1 MB), the file system is able to keep the amount of metadata (that is, the data that indicates where data blocks are stored on disk) needed to access all of the data in a file to an arbitrarily small size. One goal is thereby to allow all of the metadata to be cached in main memory so that all file system reads and writes can be done without any extra metadata reads or writes. By achieving this goal, a virtual disk stored in the VMKFS should have identical performance to, for example, a raw SCSI partition.

The VMKFS preferably takes up only a single disk partition. When it is created, it sets aside space for the file system descriptor, space for file descriptor information, including the file name, space for block allocation information, and space for block pointer blocks. The vast majority of the partition's space is used for data blocks, whose size is set when the file system is created. The larger the partition size, the larger the block size should be in order to minimize the size of the metadata.

A VMKFS file descriptor contains the name of the file, its length, its status (allocated or free), and an array of pointers to block pointer blocks, each of which contains a disk number and block number. Although a disk number is not required for unambiguous identification in single-partition configurations, it is advantageous in those cases where the file systems are allowed to span multiple partitions or disks. The block pointers in the file descriptor refer to blocks of block pointers, which in turn refer to the file's data blocks.

As is mentioned earlier, the main advantage of the VMKFS is that it ensures that all metadata may be cached in high-speed, main system memory. This can be done by using large data block sizes, with block pointers as small as 4 bytes, so that 1024 block pointers fit in a single standard memory page (in x86 platforms). As the data block size is increased, the file size that can be represented by a single page of block pointers increases. For example, if the data block size is 1 MB, then a 1 GB file can be represented with a single page of block pointers. If the data block size were increased to 64 Megabytes, however, then a single page of block pointers could represent a 64 GB file. Since virtual disks are usually at least one gigabyte in size, using large block sizes on the order of 64 Megabytes will cause virtually no wasted disk space and all metadata for the virtual disk can be cached simultaneously in system memory.

Besides being able to always keep file metadata cached in memory, the other key to high performance file I/O is to reduce the number of metadata updates. Note that the only reason why the VMKFS metadata will need to be updated is if a file is created or destroyed, or if it changes in size. Since these files are used primarily for virtual disks (or, for example, for copy-on-write redo logs), files are not often created or destroyed. Moreover, because virtual disks are usually fixed in size upon creation, the file size of a virtual disk does not change. In order to reduce the number of metadata updates on a virtual disk to zero, the system may therefore preallocate all data blocks for virtual disks when the file is created.

Reducing the frequency of metadata updates also has the advantage that the probability of file system metadata being only partially written upon a failure ("crash") of the kernel is very low. As long as conventional copy-on-write (COW) redo logs are not used, there is very little chance of the VMKFS having inconsistent metadata when the virtual disk files are preallocated: Because COW redo logs grow in size dynamically, there is a greater chance of metadata inconsistency upon a kernel crash when they are used. In order to reduce the probability of significant metadata inconsistencies, the VMKFS preferably periodically writes modified metadata back to the disk.

VMM Action Queue

The kernel 600 preferably maintains a VMM action queue 660 that it uses to inform the VMM of actions that it needs to take. This action queue provides a mechanism for the VMM to check for necessary actions even in implementations of the invention in which a VMM is single-threaded, such that the kernel cannot call into the VMM. Even in such cases, each VMM will check its portion of the action queue 660 for example, each time that it resumes a VM or each time around its idle loop. When it sees an action pending, it will do whatever is necessary to deal with the action—some actions require kernel calls and some do not.

The types of action that will typically be put on the queue include the following:

1) The VMM should raise a network interrupt. This action is posted, for example, when a network packet has been put into a receive queue within the network driver 223 of the VM. No kernel 600 call is required here.

2) A VMM SCSI command is completed. This action is posted when any SCSI command that was issued by the VMM has completed. The VMM must call into the kernel to get the information about the completed command.

3) The VMM world is corrupted or destroyed. This action is posted when some other software or hardware corrupts or destroys a VMM world while it is running. The VMM world must then call into the kernel so that it can be destroyed.

4) The VMM should run bottom-half handlers (see also below). This action is posted when a VMM calls into the kernel to forward an interrupt and a bottom-half handler was scheduled during the interrupt. In this case the VMM needs to call back into the kernel immediately in order to allow the bottom-half handlers to run.

Multiprocessor Support

The kernel 600 according to the invention may also easily be configured to support more than one CPU 110, although it of course may also run on single-CPU systems. In multiprocessor systems, during boot-up, the COS operates in a single-processor (the "boot CPU") mode. When the kernel 600 is loaded, it then activates and schedules all other processors on the machine. The kernel 600 creates then idle worlds that run on each CPU. In order to avoid otherwise necessary and very complicated administration, the COS preferably runs only on the boot CPU; VM worlds, however, may run on any CPU.

In multiprocessor (MPS) systems, the kernel 600 may obtain the MPS information from the existing BIOS and from it determine not only how many CPU's are present on the machine, but also information about APIC's (Advanced Programmable Interrupt Controllers) and IOAPIC's, as well as conventional device and bus information. Conventional spin locks may also be included for mutual exclusion, both IRQ (locks that disable interrupts) and non-IRQ.

Interprocessor Messages

The kernel preferably also includes an interprocessor messaging (IM) mechanism or module 662, which, on Intel-based architectures, may be designed on top of the Interprocessor Interrupt (IPI) support provided by the Intel hardware. In one MPS prototype of the invention, four types of IM's were supported:

1) Unicast (single CPU destination) that will wait for an acknowledgement;

2) Unicast that will not wait for an acknowledgment;

3) Broadcast (all CPUs but the sender) that will wait for acknowledgements from each CPU; and 4) Broadcast that does not wait for any acknowledgements.

At kernel initialization, each component that wishes to define an IM registers a handler with the IM module 660 and gets back an IM ID. An IM takes an IM ID, a destination CPU (this is ignored in the case of a broadcast) and a single argument. When the destination processor is interrupted by the IM, it calls the handler that is registered for the IM ID with the argument. After the handler has completed, the IM is acknowledged.

Most of the IM's used in the kernel 600 will typically be unicast messages that take a NULL argument and do not wait for an acknowledgement. These are used to interrupt another CPU so that it will perform the normal actions that it takes when it is interrupted. These types of IM's are used to get a remote CPU to recheck its scheduling queue, to force a VMM to check pending actions, or to force the COS to check for pending forwarded interrupts.

CPU Scheduling

The scheduling module 608 within the kernel according to the invention may be designed to allocate system resources, in particular, CPU time, to the different worlds. One example of how this might be done is by using "proportional-share" processor scheduling. Using this procedure, each scheduled world is allocated a number of "shares" that entitle it to a fraction of processor resources. For example, a world that is allocated twice as many shares as another is entitled to consume twice as many processor resources. In general, a runnable world with S shares in a system with an overall total of T shares is guaranteed to receive at least a fraction S/T of machine CPU resources.

An administrator can then control relative CPU rates by specifying the number of shares allocated to each world. The system automatically keeps track of the total number of shares T. Increasing the number of shares allocated to a world will dilute the effective value of all shares by increasing T.

Following the simple convention of limiting the total number of shares allocated across all worlds, one can specify absolute guarantees for minimum CPU rates. For example, if the total number of shares is limited to 10000 or less, then each share will represents a guaranteed minimum of at least 0.01% of machine CPU resources.

Shares are not hard partitions or reservations, so underutilized allocations are not wasted. Instead, inactive shares are effectively removed from consideration, allowing active worlds to benefit when extra resources are available.

Note that CPU share allocations do not necessarily guarantee world progress rates. For example, suppose world W1 is allocated 2000 shares, while world W2 is allocated 1000 shares. If both worlds are CPU-bound, such as running the same computationally intensive benchmark, then world W1 should indeed run twice as fast as world W2. However, if world W1 instead runs an I/O-bound workload that causes it to block waiting for other resources, then it will not run twice as fast as world W2, even though it is allowed to use twice as much CPU.

PRDA

In the preferred MPS configuration, the world for each CPU includes a private data area called the PRDA (see FIG. 2), which is mapped at the same address on each CPU. The PRDA is used to store per-processor information including the CPU number, bottom-half information, IM information, scheduling information, and profiling information.

Per-Processor Mapping Cache

As FIG. 2 further illustrates, in the preferred embodiment of the multi-processor configuration of the invention, each CPU has a private mapping area that is used to provide a mapping cache of physical or machine pages. Callers to the cache module (part of the world information stored in module 612) submit a <WorldID, Address> pair and get a virtual address where the physical or machine address is mapped in return. If the world ID is 0, for example, then the address is a machine address. If the world ID is non-zero, then the address is a VM physical address. When the caller is done with the mapping, the mapping is released so that the cache entry can be reused if necessary.

Timers

In MPS embodiments of the invention, the kernel preferably also uses per-CPU timers, which may be included as part of the scheduling module 608. This may be accomplished, for example using the timer that is available on the APIC. Each CPU preferably has a separate timer call-back queue; timer call-backs can then be set up to be one time only or periodic with a predetermined granularity, for example one millisecond. Timer callbacks do not happen during the timer interrupt handler. Instead, timer callbacks are done by the bottom-half handler on the CPU where the timer interrupt occurred.

Bottom-Half Handlers

There are some operations that should not be done with interrupts disabled. For example, timer call-backs should not be performed with interrupts disabled because this would severely limit what the callback can do. Another example is an Interprocessor Interrupt (IPI)—the system cannot send an IPI with interrupts disabled because this could cause deadlock if another processor is trying to send an IPI with interrupts disabled at the same time. To deal with cases such as these, the kernel preferably includes "bottom-half handlers." The term "bottom-half handler" is derived from (but is here not the same as) the Linux operating system terminology, and refers generally to an interrupt handling module that takes care of interrupt-related tasks other than the minimum necessary to take and dismiss interrupts. In Windows operating systems, the analog to the bottom-half handler is known simply as the "interrupt handler," with the Interrupt Service Routine (ISR) corresponding to the top-half handler in Linux.

A bottom-half handler 664 is therefore preferably included for each CPU, and the handlers are invoked when a current CPU's thread of control is about to leave the kernel. Examples of when this might happen are when an interrupt handler returns to non-kernel code or when a kernel call from a VMM returns. If an interrupt occurs while executing in the kernel, any bottom-half handlers scheduled by the interrupt handler will not be invoked until the interrupted thread exits the kernel—they won't be called at the end of the interrupt handler in this case because the interrupt handler will not be leaving the kernel when it returns. These restrictions on when bottom-half handlers can be called allow bottom-half handlers to perform any arbitrary actions, including grabbing non-IRQ locks, without risk of deadlock.

Any kernel component can register a bottom-half handler during kernel initialization. Upon registration, the component is given a unique ID for the bottom-half handler. If a bottom-half handler needs to be called, then a kernel function is called with the bottom-half handler ID to indicate that the bottom-half handler should be called at the next appropriate time.

Console OS

The general structure of the console operating system 420 is described above, but is explained here in somewhat greater detail. As is mentioned above, the COS may be a commodity operating system, albeit with certain modifications that adapt it for use in the invention. In one prototype of the invention, for example, the COS was a modified version of Linux 2.2.X. The purpose of the COS is to handle tasks that the kernel 600 is not configured to handle, mostly in order to avoid having to redesign features that are already adequate in existing operating systems. Examples of tasks that the COS preferably handles are:

1) Booting the machine. As is mentioned above, the COS brings up the machine in uniprocessor mode. Once the machine is booted, the kernel 600 can be loaded.

2) Slow or unimportant devices. The COS provides support for devices that are not necessary, for example for improving the performance of the virtual machines 200, . . . , 200n. These devices include, for example, the keyboard, mouse, floppy, IDE disks, display, and COM ports. In addition, the COS preferably manages some network and SCSI devices that are not needed by virtual machines.

3) Management functions. Applications may be loaded on the COS specifically for allowing the user to communicate with, configure, and manage the kernel. For example, applications may be included for loading kernel 600 modules, and programs to provision, that is, partition and copy files to, any kernel-managed disks.

4) Direct communication between users and VM's. The user will generally communicate with a VM (and the applications loaded on the VM via the same devices (mouse, keyboard, screen) that he would use to control any other conventional computer. Note that each VM will typically have its own graphical user interface (GUI). The drivers for these device and interface components will usually reside in or be loaded on the COS. In the case of slow devices, however, the VM will typically be provided with an emulator, which the respective VMM periodically calls to handle the corresponding emulation task if the VMM does not include its own emulator for the task.

COS Devices

In most implementations of the invention, the COS will be given exclusive access to certain devices. In one prototype of the invention, for example, the COS had exclusive access to all ISA devices with the exception of one of the serial ports that the kernel used for logging and debugging. In addition the COS can be allowed exclusive access to any PCI device.

As is mentioned above, although the COS performs all access to its devices directly, the kernel 600 fields the interrupts and forwards them to the COS. The loading module 423 that is loaded into the COS therefore includes interrupt-handling code to deal with the forwarded interrupts. Although this code may be designed using normal techniques, one should keep in mind that when an interrupt is forwarded, but before it is handled, it should preferably be masked in order to prevent the interrupt from occurring over and over again, which would prevent the COS from running. Once the COS is done handling the interrupt it should then unmask the interrupt.

Virtual Machine Monitor

There is preferably one virtual machine monitor (VMM) for each virtual machine. Each VMM runs as one kernel world. In order to enable each VM to behave as a "real" computer in a manner transparent to the user, the VMM needs full access to the physical machine in order to do its job. For example, the VMM has its own interrupt descriptor table IDT 302 and global descriptor table GDT 304, both of which are known concepts in the x86 architecture, with equivalent mechanisms, if needed at all, in other architectures. When a VMM world is running, all interrupts are preferably taken by the VMM and then forwarded to the kernel via a kernel call.

The VMM preferably includes the emulation module 323 to emulate network and SCSI devices for the VM so that these devices can be accessed directly from the VMM instead of going to the user level process. The action queue 660 stores a list of tasks that the VMM must process, and such information as the I/O status of a device.

VMM-to-Kernel Calls

Certain tasks may require the VMM to call the kernel, and this can be accomplished to perform certain tasks. This could accomplished, for example, either via a function call or a trap; a function call mechanism is preferred because it carries lower overhead than a trap. Regardless of which mechanism is chosen, the code and data defining the kernel must lie within the address space of the VMM before the target of the call can execute. On the other hand, the kernel cannot always be allowed to be present in the VMM's address space because the VM, which should never access the kernel's address space, must be allowed to access all of the VMM's address space (except for any space reserved for the exclusive use of the VMM itself). In one implementation of the invention, for example, the highest order 4 MB of each VMM's address spare were reserved for it. The kernel must therefor be mapped into the VMM's address space before any VMM call to the kernel, and then the VMM's address space must be restored after the call returns.

The VMM must therefore be present in the address space of the VM while it is running, but the VM must not be allowed to modify the VMM's data structures. In order to allow the VMM to be in the VM's address space while being protected from the VM, the VMM (which, in this example, resides in the upper 4 MB of the VM's address space), truncates the VM's segments so that it cannot access the VMM's code and data. As a more specific example, when the VMM is running, its segments are set up so that their base is at 0xfffc0000, with each segment having a length set to 4 MB.

In order to allow the kernel 600 to be mapped into the VMM's address space with minimal overhead, the invention may also take advantage of the segment-wrapping capabilities of the processor—all current Intel processors have this capability, and it can be implemented using conventional programming techniques in other architectures. The kernel may then be mapped in at linear address (LA) 0 and virtual address (VA) 4 MB (see FIG. 5). The segment lengths for the VMM are set to 20 Mbytes to allow the kernel 600 to be mapped in without requiring a segment register change.

This address space switching during the call is preferably optimized by using a separate page table when the kernel is mapped in. The actual steps involved in mapping in or out the kernel are to change page tables and then flush the translation look-aside buffer (TLB), which will normally be included in the CPU. Normal programming techniques may be used to perform these steps.

Interrupts

Each VMM 300 preferably maintains its own interrupt descriptor table IDT and handler 302, which takes all interrupts that occur while the VMM world is running. The VMM should maintain its own IDT 302 for several reasons.

First, the VMM needs to handle all exceptions that occur while its VM is running, in order for the VM to faithfully act like the "real" system it is designed to simulate/emulate. For example, if a VM takes a page fault, then the VMM needs to handle it.

Second, the kernel 600 is not mapped into the VMM's address space while a VM is running, so interrupts cannot go directly to the kernel. This problem could be addressed through the use of the task gate feature of the Intel processor. When the VMM gets an interrupt, it can forward the interrupt to the kernel via a kernel call.

Third, the VMM needs to get periodic timer interrupts so that it can give the proper number of timer interrupts to the VM.

Load Call Module 423

As is mentioned above, the load call module 423 allows the COS 420 to load and communicate with the kernel 600, and is loaded into the COS after the COS boots, but before the kernel is loaded. The functions that the load call module perform include:

1) Implementing a special system call handler that allows COS applications to call the load call module.

2) Loading and unloading of the kernel 600.

3) Handling forwarded kernel interrupts.

4) The COS side of kernel to COS RPC's. This involves implementing a connection device.

5) A memory device to allow a COS application to have access to a VM's physical memory via memory mapping.

6) "Stubs," that is, code that takes a system call and converts it into a kernel call, for many kernel system calls.

7) COS access to kernel SCSI and network devices.

COS Address Space

Figure 6:
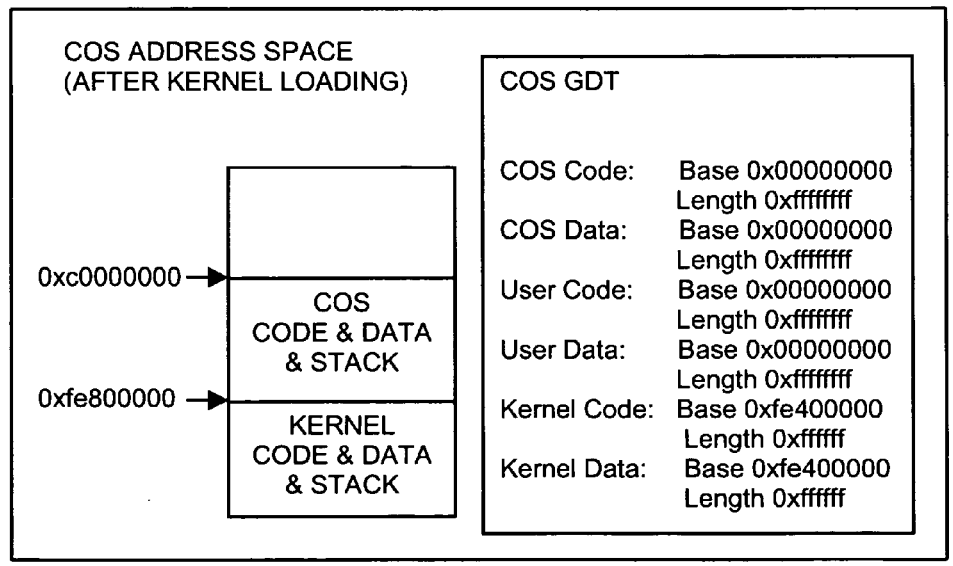

FIG. 6 illustrates one example of the arrangement of the address space used by the COS 420. In one prototype of the invention, when the kernel 600 was loaded, it was mapped into the COS address space in high memory so that all of the kernel's code and data would be accessible from the COS. The stack that was used when the COS called into the kernel resided at the base of the kernel's code and data segment instead of in the normal place for a world's stack. In this configuration, a non-COS world's stack extended from 0x1000 to 0x1fff, whereas the COS world's stack extended from 0x401000 to 0x401fff. This was done to make it easier to switch context from the COS world to a normal world. In the prototype, the bottom 4 MB of the COS world was not used, since it would be used only to hold the stack. Because of this, there was no need to map the bottom 4 MB of the kernel into the COS address space.

When the COS called into the kernel, the page table and GDT were not switched; however, the code, data, and stack segments were switched, as well as the stack itself. The page table then did not need to be switched at all because the kernel was mapped into it in high memory.

Shared Memory

Because the kernel 600 is preferably mapped into the COS address space, as described above and illustrated in FIG. 6, it is easy for the COS to access kernel memory. This feature then also allows the kernel and the load call module 423 to share certain data structures. For example, a log for the kernel may be stored in a buffer in the kernel. When the loader application 500 (for example, for diagnostic reasons of the user) needs to read out the log information, it may then simply call the load call module 423, which then copies out the log data via the shared memory.

Loading and Unloading the Kernel—Specifics

The general concept of loading the kernel 600 is discussed above. The particulars of this loading operation in the preferred embodiment of the invention are as follows:

1) Mapping the kernel code and data into the upper part of the COS address space. All of the kernel code and data is then accessible from the COS (see FIG. 6);

2) Adding GDT entries for the kernel with a base of the kernel 600 is loaded in the COS address space (see FIG. 6);

3) Redirecting the COS interrupt handlers to special handlers included in the load call module 423; and 4) Allocating an IRQ that is reserved for kernel interrupts of the COS.

Once these steps are followed the load call module 423 can call the kernel's entry point. As part of calling the kernel entry point, all segments and the stack are also switched, thereby completing the "isolation" of the COS from the hardware 100.

Unloading the kernel involves simply reversing the steps involved in loading the kernel: The kernel is called and a shut-down routine is executed; the special IRQ is released; the COS interrupt handlers are restored to the state before the kernel was loaded, that is, they are directed to the COS instead of to the kernel; control of kernel-managed and shared devices are transferred from the kernel to the first operating system; and kernel 600 is removed from the COS address space. Once the kernel is unloaded, the COS is restored to being in exclusive control of the computer hardware. One may want or need to unload the kernel, for example, in order to reconfigure the system as a whole, or for purposes of debugging.

Kernel Calls

Kernel system calls may be implemented to enable user applications 800 (FIG. 3) and the load call module to call into the kernel 600, for example, in order to increase efficiency by enabling direct system call traps. All kernel system calls preferably go through the load call module 423, including calls that originate in COS applications. The load call module then calls the kernel. All arguments to the kernel may, for example, be passed in registers. As part of the call the code, data, and segment registers should be switched, as well as the stack pointer.

Handling Forwarded Interrupts

As is mentioned above, the kernel 600 forwards interrupts to the COS 420 for devices that the COS is managing. Whenever the COS world is about to return from the kernel 600, the pending interrupts are first checked. If an interrupt is pending, then it is forwarded by calling the low-level, native interrupt handler included in the original COS IDT before the kernel was loaded. (Note that all conventional operating systems require some form of interrupt handler.) This handler is called by arranging the COS stack such that the handler is called upon return from the kernel. Before any interrupts can be forwarded they first are masked in the hardware so that they will not recur until they are handled by the COS.

When the low-level COS interrupt handler is called, it calls an interrupt handler 427 within the load call module 423. This handler takes the necessary, predetermined action and then unmasks the interrupt if the interrupt is still enabled for the device. This handler 427 preferably uses a shared kernel 600 data structure to determine how to unmask the interrupt.

Memory Mapping

Certain applications that run on the COS may need access to the physical memory of a VM 200, as well as to other memory that is used by the VMM 300. One way to make this access possible is to allow such applications to map the memory of the corresponding component into its address space.

The load call module 423 makes this possible by exporting a device that can be memory mapped. The load call module 423 will then handle page faults on the mapped memory by calling the kernel to handle the page fault. The kernel will then return the machine page that should be mapped at the faulting virtual address to the load call module.

Load Call Module Interrupt

When the kernel 600 is loaded, the load call module 423 allocates an IRQ that the kernel may use to signal the load call module. The load call module then also registers its interrupt handler 427 for this IRQ. Whenever the kernel 600 needs to signal a need for some action by the COS 420, it can then raise this "fake" interrupt, which will cause the interrupt handler 427 to be called. This interrupt can be raised for numerous reasons, such as shared SCSI and network interrupts. The kernel and the load call module may use shared memory to indicate the reason for the interrupt.

Shared SCSI

One advantage of the invention is that it enables the COS 420 to share kernel adapters such as, for example, a SCSI adapter 645. The COS will then have access to all SCSI targets on the shared adapter. The steps to sharing a SCSI adapter are the following:

1) The kernel allocates the adapter 645 to the COS.

2) The COS loads a SCSI adapter device driver for the adapter; such a driver may be designed using normal programming methods.

3) All SCSI commands pending in the kernel are completed and the kernel allows no new SCSI commands.

4) The COS transfers control of the device back to the kernel.

5) A SCSI adapter device driver is loaded into the kernel and initialized.

6) The COS SCSI function pointers for the adapter are changed to point to new functions, such as queuing and abort functions that are provided by the load call module.

7) The SCSI adapter can now accept COS SCSI commands.

Once the SCSI adapter 645 becomes shared, the load call module 423 calls the kernel to open all SCSI targets on the adapter. The load call module then handles any new commands that are queued or completed: Queuing is done by calling the kernel with the appropriate SCSI target handle and the kernel signals command completion to the load call module by raising an appropriate interrupt that is sensed by the handler 427. Adapters for other devices and functions may be shared by the kernel and COS following the same or similar procedures; any necessary alterations will lie within the skill of operating system designers.

Other Shared I/O Devices

SCSI is just one example of a mass storage controller that may be shared by the kernel and the COS. Other examples of shared block I/O devices are RAID and IDE controllers. The procedure by which these and similar devices are shared will be essentially the same as has just been explained above for SCSI devices.

Shared Network

Yet another and particularly useful example of how the invention allows the kernel 600 and COS 420 to share adapters is the sharing of an adapter 644 for access to the network 700. If this feature of the invention is included in a given implementation, then the COS will be able to access the network adapter (and thus the network) just like any other adapter. The mechanism used to share the network adapter is different than what is used to share the SCSI adapter, because the COS may actually boot off of the SCSI. The steps for sharing a network adapter are the following:

1) Since network connectivity is assumed in the system as a whole, there will be some form of network adapter with which the COS communicates. If this adapter is currently allocated to the COS, then control must be passed to the kernel. If the native network interface is currently active, then it must be inactivated and the network adapter must be unloaded from the COS. If the adapter is the adapter 644, or is otherwise already under the control of the kernel, then this step may be omitted.

2) The appropriate network adapter 644 (if not already present) is loaded into the kernel 600 and initialized.

3) A driver module 444 constituting a console network adapter is loaded into the COS. This driver 444 calls the load call module 423 to register a function to be called when a interrupt is raised and sensed by the handler 427 where the reason is that a network packet is pending.

4) The COS network interfaces made accessible by the driver 444 module are activated on the COS by being assigned an IP address and being enabled to send and receive packets.

Once loaded, the driver module 444 can send packets by calling the kernel directly. When packets are received that are destined for the COS interface, a corresponding interrupt is raised and the load call module 423 calls into the driver 427 where the interrupt is handled.

Kernel Devices

According to the invention, the kernel is allowed to manage devices directly, which also enables the kernel to provide support for such high-performance operations as networking and disk I/O. The general mechanism that can be followed to load drivers into the kernel 600 has been discussed in previous sections. Here, an example, of how a high-performance device works from a virtual machine 200 all the way down to a driver emulation layer (for example, in Linux) will be discussed.

There are several main components involved in providing high performance IO:

1) The driver 223 in the virtual machine, which should be programmed (which may be done using known techniques) to be able to operate at the necessary speed.

2) The virtual network emulation module 323 in the VMM 300—the VMM is responsible for handling input and output via the I/O ports that are necessary for the various drivers to talk to the virtual device 323. (Port configuration is well known in the art of computer operating systems.)

3) The mechanism, for example, within the scheduler 608, by which the VMM calls the kernel. This mechanism may be the same as that used by a VMM to call to a conventional operating system and is well known to those who design virtual machine technology.

4) The device-independent device driver emulation code, which, for example, converts commands for use by the actual OS device drivers.

5) A device-specific device driver 423.

6) The device-independent network 700.

Efficient I/O

The invention provides several advantages over conventional systems when it comes to both high-speed (such as networking) and slower (such as SCSI) data transfers. In general, rather than following the normal path through the COS, in the preferred embodiment of the invention, a packet can be routed from a VM (via the driver 223) and via the kernel 600 to the actual (or virtual) device, in some cases bypassing the VMM almost completely. Of course, transfer of a packet from the network to the VM would simply follow the reverse path.

One advantage of routing data packets via the kernel 600 instead of via the COS 420 is that the kernel can ensure that the transfer takes place as fast as possible by scheduling the transfer to have minimum interruptions, or no interruptions at all. Similar efficiencies are present in network packet receive and SCSI I/O operations. Note that thanks to the ability of the invention to schedule and carry out the transfer without interference from the COS, no context switching is required.

Examples of data I/O between a VM and a high-speed (here: network) and lower speed (here: SCSI) device will now be described.

Networking

The latency involved in a physical machine pinging another physical machine on a 100 MB local area network is typically on the order of 100 to 200 microseconds. Likewise, when a 100 MB card is run to capacity there are around 8000 packets sent per second, which means that a packet is sent every 125 microseconds. In order for a virtual machine to attain near native performance, the amount of overhead that can be added to the networking path must therefore be kept small.

In the preferred embodiment of the invention, overhead is reduced thanks to a driver 223, which acts as a network interface card, and which operates in the virtual machine world. If a similar driver, a console network adapter 424, is installed in and used by the COS, then instead of using IN/OUT operations to communicate with the VMM, the console network adapter may use direct system calls to the kernel.

Network Emulation Module 323

If the performance advantage of the invention with respect to networking depends on a special device emulator, then we need to describe the emulator in more detail, at least what makes it special.

In the preferred embodiment of the invention, a virtual network (in one prototype, an Ethernet) interface 223 is included within the VM to reduce virtualization overhead. This interface allows good networking performance because of the following features:

1) the driver 223 in the VM and the kernel are allocated a shared memory region that is used to maintain transmit and receive queues;

2) a transmit can occur with only a single "IN" operation;

3) transmits can be done with no need to create any copies; and 4) a receive can occur with only one "OUT" operation.

In order to transmit a packet to the network, the driver 223 puts a pointer to the packet in the shared memory region and then performs an IN operation, which functions as a request for transmission and returns the status of the transmit. The packet memory is then kept by the kernel in a portion of the shared memory region acting as a transmit packet buffer until the packet has been transmitted. Once the packet has been transmitted, the kernel puts the packet onto a finished transmit queue. This queue will then be examined by the driver 223 upon the next transmit.

A packet is received in the following manner:

1) The kernel copies the packet data into a free physical receive buffer pointed to by the shared data and appends it to a receive packet-pending queue.

2) The kernel instructs the VMM 300 (using normal techniques) to raise an interrupt.

3) Note that the VM, since it virtualizes an entire computer, will have its own internal interrupt handler. When the VM is interrupted, which it will sense via its included interrupt handler, it examines the packet-pending queue in the buffer portion of the memory region that is shared by the VM and VMM, locates the packet, and handles it in any predetermined manner.

4) When the VM finds no more packets, it acknowledges the interrupt and returns from the interrupt handler. Note that this interrupt acknowledgement requires a single OUT operation.

VMM Device Emulation

The VMM 300 is responsible for emulating the network device associated with the driver 223, which implies that it must field IN and OUT operations as well as raise interrupts. During initialization, the VMM's emulation module 323 also indicates to the kernel where the shared memory is physically located, gets the unique network address, and sets receive and transmit queue sizes. These steps can all be implemented using know programming techniques. Note that, for transmits, the VMM merely has to handle the IN operation, call the kernel to do the transmit, and then return the status of the transmit to the VM. For receives, the VMM needs only to raise an interrupt to the VM.

Kernel—Networking Responsibilities

The kernel is responsible for managing all users of the network devices, which can be used in an exclusive mode or a shared mode. In the exclusive mode, the corresponding device is dedicated to a particular world, which gets network address of the corresponding physical device. This allows the network interface to receive packets, using the procedure described above, for the world without needing to be able to examine all packets, that is, even those not destined for it. In the shared mode, a device can be used by multiple worlds. In this case, however, a network address is created for each instance and the network device is put into a mode in which it does examine all packets.

Network devices are opened via a kernel system call. An "open" call takes the name of the physical adapter and returns a unique handle that can be used for subsequent operations on the device. In the case of a VM world, the "open" operation may be done either by a dedicated application loaded on the COS, whereby the returned handle is passed to the VMM to be used for future operations. In the case of a network device that is being used by the COS, however, the console driver 424 preferably carried out the "open" operation.

The kernel then maps the shared memory used by the world's device driver into the kernel's address space. This allows the kernel to copy and enqueue received packets directly into the world's address space, without involving the VMM at all, although the VMM does have to be notified to raise an interrupt when the receive is complete.

Note that, following the procedures and using the mechanisms described above, a network packet can be passed between a VM and the network without having to be routed through the COS, and in some cases without having to be transferred by the VMM. In other words, network packets can pass with essentially only a single "hand-over" (via the respective queue), thereby greatly reducing the overhead of networking.

Virtual Networks

In addition to, for example, physical Ethernet adapters connected to physical networks supported by the kernel, the kernel according to the invention also supports virtual Ethernet (or other network) adapters connected to virtual networks. A virtual network is a private network maintained by the kernel that is not associated with any physical network device. Worlds can then use (address, transfer packets between, etc.) a virtual network just like they would a physical network. In fact, a world in the invention cannot determine whether it is dealing with a physical network or a virtual network.

SCSI

SCSI devices are much slower than network devices: It typically takes multiple milliseconds for any SCSI data transfer to complete. As a result, for such devices, there is no need to include in the VMM a dedicated emulation module functioning as an interface, because any overhead will be insignificant to the overall latency and throughput of a VM's SCSI device. Instead, in those instances in which the VM includes a virtual SCI device, a bus logic adapter driver 224 is preferably included within the VOS 222 to emulate a standard SCSI adapter interface. The various components and operations used to enable efficient operation of SCSI devices in virtual worlds will now be described.

Kernel—SCSI Mechanisms

The kernel allows any partition on a SCSI target (for example, partition 0 may represent the whole disk) to be opened. SCSI <target, partition> pairs are opened via a kernel system call. The open call returns a unique handle that can be used for subsequent operations on the device. The open can be done from several places for several reasons:

1) by a dedicated application running on the COS, where the handle is then passed to the VMM to be used for future operations;

2) by the kernel, if the partition contains a kernel file system;

3) by the loading module 423 if it is sharing a target with the kernel; and 4) by the loading module 423 if it wants to access a target using special virtual SCSI devices supported by the loading module itself.

As long as a partition is opened by any world, the partition cannot be opened by any other world, except in the case of COS sharing. If the COS is sharing a target with the kernel, then the COS is allowed to open the whole disk while other worlds have other partitions open. This is necessary because once the COS sees a disk before it is controlled by the kernel, then it always expects to see the whole disk.

What is claimed is:

1. A method of managing communication between hardware and software resources of a computer system, said method comprising:

running said software resources on said computer system, with said software resources including a kernel and a Console Operating System (COS), said kernel running at a system level so as to have permission to directly access said hardware resources; and selectively allowing said COS to access a subset of said hardware resources by said kernel scheduling said access in response to said kernel receiving interrupts relating to said hardware resources of said subset, with said interrupts being received into an address space of said computer system controlled by said kernel.

2. The method as recited in claim 1 wherein said selectively allowing further includes selectively allowing said COS to access an additional subset of said hardware resources.

3. The method as recited in claim 1 wherein said running further includes running said COS on said kernel.

4. The method as recited in claim 1 further including initializing said computer system with said COS and loading said kernel, using said COS.

5. The method as recited in claim 4 further including executing said kernel with said kernel substantially displacing said COS so that requests for system resources are handled via said kernel, including scheduling execution of said COS on a hardware processor.

6. The method as recited in claim 5 further including halting execution of said kernel, establishing a state of said COS that existed before loading of said kernel; and resuming execution of said COS.

7. The method as recited in claim 4 wherein said loading said kernel further includes loading a load call module within said COS, and upon initialization of said computer system, calling a loading module from said load call module, whereupon said loading module loads said kernel.

8. The method as recited in claim 7 wherein said loading said load call module within said COS further includes installing said load call module as a driver within said COS.

9. The method as recited in claim 1 further including installing a virtual machine (VM) to run on said kernel via a virtual machine monitor (VMM).

10. The method as recited in claim 9 further including mapping a kernel address space, within which said kernel is stored and is addressable by said kernel, into a VMM address space, within which said VMM is stored and which is addressable by said VMM.

11. The method as recited in claim 9 further including providing said computer system with a segmented memory architecture addressable via segment registers, and establishing a segment length for said VMM in which to store both said VMM and said kernel.

12. The method as recited in claim 9 further including providing said VM with a virtual processor, a virtual operating system (VOS), and a virtual disk (VDISK), partitioning said VDISK into VDISK blocks, maintaining an array of VDISK block pointers including a plurality of sets of VDISK block pointers, maintaining a file descriptor table in which is stored file descriptors, each file descriptor storing block identification and allocation information, and at least one pointer block pointer, with each pointer block pointer pointing to one of the sets of VDISK block pointers, and each VDISK block pointer identifying a location of a respective one of said VDISK blocks.

13. A method of managing communication between hardware and software resources of a computer system, said method comprising:
 running said software resources on said computer system, with said software resources including a kernel and a Console Operating System (COS), said kernel running at a system level so as to have permission to directly access said hardware resources; and
 selectively allowing said COS to access a subset of said hardware resources by said kernel scheduling said access in response to said kernel receiving interrupts relating to said hardware resources of said subset and forwarding, with said kernel, said interrupts to said COS to allow access to said subset of said hardware resources.

14. The method as recited in claim 13 wherein said selectively allowing further includes selectively allowing said COS to access an additional subset of said hardware resources.

15. The method as recited in claim 13 wherein said running further includes running said COS on said kernel.

16. The method as recited in claim 13 wherein said selectively allowing said COS further includes receiving interrupts and faults into an address space of said computer system controlled by said kernel.

17. The method as recited in claim 13 further including initializing said computer system with said COS and loading said kernel, using said COS.

18. The method as recited in claim 17 further including executing said kernel with said kernel substantially displacing said COS so that requests for system resources are handled via said kernel, including scheduling execution of said COS on a hardware processor.

19. The method as recited in claim 18 further including halting execution of said kernel, establishing a state of said COS that existed before loading of said kernel; and resuming execution of said COS.

20. The method as recited in claim 17 wherein said loading said kernel further includes loading a load call module within said COS, and upon initialization of said computer system, calling a loading module from said load call module, whereupon said loading module loads said kernel.

21. The method as recited in claim 20 wherein said loading said load call module within said COS further includes installing said load call module as a driver within said COS.

22. The method as recited in claim 13 further including installing a virtual machine (VM) to run on said kernel via a virtual machine monitor (VMM).

23. The method as recited in claim 22 further including mapping a kernel address space, within which said kernel is stored and is addressable by said kernel, into a VMM address space, within which said VMM is stored and which is addressable by said VMM.

24. The method as recited in claim 22 further including providing said computer system with a segmented memory architecture addressable via segment registers, and establishing a segment length for said VMM in which to store both said VMM and said kernel.

25. The method as recited in claim 22 further including providing said VM with a virtual processor, a virtual operating system (VOS), and a virtual disk (VDISK), partitioning said VDISK into VDISK blocks, maintaining an array of VDISK block pointers including a plurality of sets of VDISK block pointers, maintaining a file descriptor table in which is stored file descriptors, each file descriptor storing block identification and allocation information, and at least one pointer block pointer, with each pointer block pointer pointing to one of the sets of VDISK block pointers, and each VDISK block pointer identifying a location of a respective one of said VDISK blocks.

26. A computer system comprising:
 a hardware processor;
 a kernel;
 a Console Operating System (COS), with said kernel having permission to directly access said hardware processor and including a software module for handling requests for resources of said computer system, including scheduling execution of said COS on said hardware processor;
 a virtual machine (VM) having a virtual processor, a virtual operating system (VOS), and a virtual disk (VDISK) partitioned into multiple VDISK blocks; and
 a virtual machine monitor (VMM), with said VM being installed to run on said kernel via said VMM, with said kernel further including a plurality of VDISK block pointers defining an array of VDISK block pointers, a file descriptor table including file descriptors, each of which stores block identification and allocation information and a pointer block pointer, said pointer block pointer pointing to one of the sets of VDISK block pointers and each VDISK block pointer identifying a location of one of said multiple VDISK blocks.

27. The system as recited in claim 26 further including applications running on said COS and a load call module to interface communication between said applications and said kernel.

28. The system as recited in claim 26 further including memory having a kernel address space, within which said kernel is stored and is addressable by said kernel and a mapping module comprising computer-executable code for mapping said kernel address space into a VMM address space, within which said VMM is stored and which is addressable by said VMM.

29. The system as recited in claim 26 further including a segmented memory architecture and segment registers via which said segmented memory architecture is addressed, with a length of one the segments of said memory architecture being larger than a minimum length necessary to fully contain both said VMM and said kernel.

30. A computer system comprising:
 a hardware processor;
 a kernel;
 a Console Operating System (COS) configured to run on said hardware processor at a most-privileged system level said system level being defined as an operational state with permission to directly access predetermined physical resources of said computer system and facilitate initialization of said computer system with said kernel having permission to directly access said hardware processor and including a software module for handling requests for resources of said computer system, including scheduling execution of said COS on said hardware processor; and a loader comprising computer-executable code for loading said kernel via said COS and for starting execution of said kernel, said loader including a loading driver installed within said COS.

31. The system as recited in claim 30 further including applications running on said COS and a load call module to interface communication between said applications and said kernel.

32. The system as recited in claim 30 further including a virtual machine (VM), a virtual machine monitor (VMM), with said VM being installed to run on said kernel via said VMM.

33. The system as recited in claim 32 further including memory having a kernel address space, within which said kernel is stored and is addressable by said kernel and a mapping module comprising computer-executable code for mapping said kernel address space into a VMM address space, within which said VMM is stored and which is addressable by said VMM.

34. The system as recited in claim 32 further including a segmented memory architecture and segment registers via which said segmented memory architecture is addressed, with a length of one the segments of said memory architecture being larger than a minimum length necessary to fully contain both said VMM and said kernel.

35. The system as recited in claim 32 wherein said VM includes a virtual processor, a virtual operating system (VOS), and a virtual disk (VDISK), with said VDISK being partitioned into multiple VDISK blocks and said kernel further including a plurality of VDISK block pointers defining an array of VDISK block pointers, a file descriptor table including file descriptors, each of which stores block identification and allocation information and a pointer block pointer, with said pointer block pointer pointing to one of the sets of VDISK block pointers and each VDISK block pointer identifying a location of one of said multiple VDISK blocks.

36. A computer storage device embodying computer software when executed by a processor implementing a method for communication between hardware and software resources of a computer system, the method comprising:
running said software resources on said computer system, with said software resources including a kernel and a Console Operating System (COS), said kernel running at a system level so as to have permission to directly access said hardware resources; and
selectively allowing said COS to access a subset of said hardware resources by said kernel scheduling said access in response to said kernel receiving interrupts relating to said hardware resources of said subset, with said interrupts being received into an address space of said computer system controlled by said kernel.

37. The device as recited in claim 36 wherein said selectively allowing further includes selectively allowing said COS to access an additional subset of said hardware resources.

38. The device as recited in claim 36 wherein said running further includes running said COS on said kernel.

39. The device as recited in claim 36 where said selectively allowing further includes receiving, with said kernel, said interrupts, and forwarding, with said kernel, said interrupts to said COS to allow access to said hardware resources.

40. The device as recited in claim 36 wherein the method further includes initializing said computer system with said COS and loading said kernel, using said COS.

41. The device as recited in claim 40 wherein the method further includes executing said kernel with said kernel substantially displacing said COS so that requests for system resources are handled via said kernel, including scheduling execution of said COS on a hardware processor.

42. The device as recited in claim 41 wherein the method further includes halting execution of said kernel, establishing a state of said COS that existed before loading of said kernel; and resuming execution of said COS.

43. The device as recited in claim 40 wherein said loading said kernel further includes loading a load call module within said COS, and upon initialization of said computer system, calling a loading module from said load call module, whereupon said loading module loads said kernel.

44. The device as recited in claim 43 wherein said loading said load call module within said COS further includes installing said load call module as a driver within said COS.

45. The device as recited in claim 36 wherein the method further includes installing a virtual machine (VM) to run on said kernel via a virtual machine monitor (VMM).

46. The device as recited in claim 45 wherein the method further includes mapping a kernel address space, within which said kernel is stored and is addressable by said kernel, into a VMM address space, within which said VMM is stored and which is addressable by said VMM.

47. The device as recited in claim 45 wherein the method further includes providing said computer system with a segmented memory architecture addressable via segment registers, and establishing a segment length for said VMM in which to store both said VMM and said kernel.

48. The device as recited in claim 45 wherein the method further includes providing said VM with a virtual processor, a virtual operating system (VOS), and a virtual disk (VDISK), partitioning said VDISK into VDISK blocks, maintaining an array of VDISK block pointers including a plurality of sets of VDISK block pointers, maintaining a file descriptor table in which is stored file descriptors, each file descriptor storing block identification and allocation information, and at least one pointer block pointer, with each pointer block pointer pointing to one of the sets of VDISK block pointers, and each VDISK block pointer identifying a location of a respective one of said VDISK blocks.

49. A computer storage device embodying computer software when executed by a processor implementing a method for communication between hardware and software resources of a computer system, the method comprising:
running said software resources on said computer system, with said software resources including a kernel and a Console Operating System (COS), said kernel running at a system level so as to have permission to directly access said hardware resources; and
selectively allowing said COS to access a subset of said hardware resources by said kernel scheduling said access in response to said kernel receiving interrupts relating to said hardware resources of said subset and forwarding, with said kernel, said interrupts to said COS to allow access to said subset of said hardware resources.

50. The computer storage device as recited in claim 49 wherein said selectively allowing further includes selectively allowing said COS to access an additional subset of said hardware resources.

51. The computer storage device as recited in claim 49 wherein said running further includes running said COS on said kernel.

52. The computer storage device as recited in claim 49 wherein said selectively allowing said COS further includes receiving interrupts and faults into an address space of said computer system controlled by said kernel.

53. The computer storage device as recited in claim 49 wherein the method further includes initializing said computer system with said COS and loading said kernel, using said COS.

54. The computer storage device as recited in claim 53 wherein the method further includes executing said kernel with said kernel substantially displacing said COS so that requests for system resources are handled via said kernel, including scheduling execution of said COS on a hardware processor.

55. The computer storage device as recited in claim 54 wherein the method further includes halting execution of said kernel, establishing a state of said COS that existed before loading of said kernel; and resuming execution of said COS.

56. The computer storage device as recited in claim 53 wherein loading said kernel further includes loading a load call module within said COS, and upon initialization of said computer system, calling a loading module from said load call module, whereupon said loading module loads said kernel.

57. The computer storage device as recited in claim 56 wherein loading said load call module within said COS further includes installing said load call module as a driver within said COS.

58. The computer storage device as recited in claim 49 wherein the method further includes installing a virtual machine (VM) to run on said kernel via a virtual machine monitor (VMM).

59. The computer storage device as recited in claim 58 wherein the method further includes mapping a kernel address space, within which said kernel is stored and is addressable by said kernel, into a VMM address space, within which said VMM is stored and which is addressable by said VMM.

60. The computer storage device as recited in claim 58 wherein the method further includes providing said computer system with a segmented memory architecture addressable via segment registers, and establishing a segment length for said VMM in which to store both said VMM and said kernel.

61. The computer storage device as recited in claim 58 wherein the method further includes providing said VM with a virtual processor, a virtual operating system (VOS), and a virtual disk (VDISK), partitioning said VDISK into VDISK blocks, maintaining an array of VDISK block pointers including a plurality of sets of VDISK block pointers, maintaining a file descriptor table in which is stored file descriptors, each file descriptor storing block identification and allocation information, and at least one pointer block pointer, with each pointer block pointer pointing to one of the sets of VDISK block pointers, and each VDISK block pointer identifying a location of a respective one of said VDISK blocks.

* * * * *